US008204109B2

(12) United States Patent
Xiong et al.

(10) Patent No.: US 8,204,109 B2
(45) Date of Patent: Jun. 19, 2012

(54) OVERCOMPLETE BASIS TRANSFORM-BASED MOTION RESIDUAL FRAME CODING METHOD AND APPARATUS FOR VIDEO COMPRESSION

(75) Inventors: Yi Xiong, Burnaby (CA); Mark Sauer, Vancouver (CA); Meng Wang, Vancouver (CA); Peter Koat, Surrey (CA)

(73) Assignee: Etiip Holdings Inc., Vancouver, British Columbia ( * ) Notice: Subject to any disclaimer, the term of this patent is extended or adjusted under 35 U.S.C. 154(b) by 992 days.

(21) Appl. No.: 10/551,359

(22) PCT Filed: Mar. 29, 2004
(Under 37 CFR 1.47)

(86) PCT No.: PCT/CA2004/000464
§ 371 (c)(1),
(2), (4) Date: Oct. 3, 2008

(87) PCT Pub. No.: WO2004/086302
PCT Pub. Date: Oct. 7, 2004

(65) Prior Publication Data
US 2009/0103602 A1 Apr. 23, 2009

(30) Foreign Application Priority Data
Mar. 28, 2003 (CA) ..................................... 2423618

(51) Int. Cl.
*H04N 11/02* (2006.01)
(52) U.S. Cl. ......... 375/240.01; 375/240.16; 375/240.19; 375/240.24
(58) Field of Classification Search .......................... None
See application file for complete search history.

(56) References Cited

U.S. PATENT DOCUMENTS
5,699,121 A * 12/1997 Zakhor et al. ............ 375/240.17
(Continued)

FOREIGN PATENT DOCUMENTS
EP 0933943 8/1999
(Continued)

OTHER PUBLICATIONS
International Search Report for Application No. PCT/CA2004/000464, date mailed on Aug. 3, 2004, 3 pages.
(Continued)

*Primary Examiner* — Christopher S Kelley
*Assistant Examiner* — Christopher Findley
(74) *Attorney, Agent, or Firm* — Morrison & Foerster LLP (57) ABSTRACT

The present invention provides a method to compress digital moving pictures or video signals based on an overcomplete basis transform using a modified Matching Pursuit algorithm. More particularly, this invention focuses on the efficient coding of the motion residual image, which is generated by the process of motion estimation and compensation. A residual energy segmentation algorithm (RESA) can be used to obtain an initial estimate of the shape and position of high-energy regions in the residual image. A progressive elimination algorithm (PEA) can be used to reduce the number of matching evaluations in the matching pursuits process. RESA and PEA can speed up the encoder by many times for finding the matched basis from the pre-specified overcomplete basis dictionary. Three parameters of the matched pattern form an atom, which defines the index into the dictionary and the position of the selected basis, as well as the inner product between the chosen basis pattern and the residual signal. The present invention provides a new atom position coding method using quad tree like techniques and a new atom modulus quantization scheme. A simple and efficient adaptive mechanism is provided for the quantization and position coding design to allow a system according to the present invention to operate properly in low, medium and high bit rate situations. These new algorithm components can result in a faster encoding process and improved compression performance over previous matching pursuit based video coders.

9 Claims, 7 Drawing Sheets

U.S. PATENT DOCUMENTS

| | | | |
|---|---|---|---|
| 6,625,213 B2 * | 9/2003 | Bottreau et al. | 375/240.08 |
| 7,003,039 B2 * | 2/2006 | Zakhor et al. | 375/240.22 |
| 7,439,970 B1 * | 10/2008 | Clarke | 345/419 |
| 2002/0114393 A1 * | 8/2002 | Vleeschouwer | 375/240.16 |

FOREIGN PATENT DOCUMENTS

| | | |
|---|---|---|
| JP | 09-322159 | 12/1997 |
| JP | 2002-314428 | 10/2002 |

OTHER PUBLICATIONS

Mallat and Zhang, IEEE Transaction in Signal Processing (1993) 41(12):3397-3415.

Neff and Zakhor, IEEE Transactions on Circuits and Systems for Video Technology (1997) 7(1):158-171.

Vleeschouwer and Macq, "New Dictionaries for Matching Pursuit Video Coding", Proc. of the 1998 International Conference on Image Processing 1:764-768.

Japanese Office Action from Japanese Patent Application No. 2006-504088, mailed on Mar. 16, 2010, 3 pages.

Yokohama, Institute of Television Engineers of Japan Technical Report, Institute of Television Engineers of Japan, Jul. 12, 1991, vol. 15, No. 40, pp. 13-18.

* cited by examiner

OVERCOMPLETE BASIS TRANSFORM-BASED MOTION RESIDUAL FRAME CODING METHOD AND APPARATUS FOR VIDEO COMPRESSION

FIELD OF THE INVENTION

The present invention pertains to the field of compression and in particular to video compression methods and apparatuses.

BACKGROUND

A sequence of pictures can occupy a vast amount of storage space and require very high transmission bandwidth when represented in an uncompressed digital form. Point to point digital video communication became practicable several years ago following advances in computer networks and signal compression technology.

The standardization effort for digital video compression was initiated in approximately 1988. Currently, the Moving Picture Experts Group (MPEG) committee under ISO/IEC has completed both the MPEG-1 and the MPEG-2 standards; the MPEG-4 standard has also been completed, but new proposals are still being accepted. In addition, CCITT developed a series of recommendations—H.261, H.263 and H.263+—that focus on low bit rate applications. All of these attempts at standardization utilize a two-step procedure to compress a video sequence. The first step uses a motion estimation and compensation algorithm to create a predicted video frame for the current video frame using the previous video frame, wherein the difference between the current video frame and the predicted video frame is computed and is called the motion residual picture (MRP). The second step in the standard procedure is to code the MRP using the Discrete Cosine Transform (DCT). Such DCT-based systems do not perform well in all circumstances. At the low bit rates needed for personal video communication, DCT-based systems cause noticeable distortion and visible block artifacts. For high visual quality applications, such as DVD, the compression ratio achieved can be quite low.

Motion residual pictures can be coded using other transform-based techniques. For example, discrete wavelet transforms (DWT) and overcomplete basis transforms can also be used. Zakhor and Neff presented a motion residual coding system in U.S. Pat. No. 5,699,121 based on an overcomplete basis transform algorithm called matching pursuit. This was first proposed by Mallat and Zhang in *IEEE Transaction in Signal Processing*, vol. 41, No. 12, December 1993. Zakhor and Neff's video coder improves both the visual quality and the PNSR over standard DCT-based video coders. However, their system is very slow and the compression performance is not optimized due to an ad-hoc design for matched basis position coding and quantization of the transform coefficients. Therefore there is a need for a new overcomplete transform based video coding technique that can provide both speed and efficiency.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a overcomplete basis transform-based motion residual frame coding method and apparatus for video compression. In accordance with an aspect of the present invention, there is provided a method for encoding a residual image using basis functions from an overcomplete library, said method comprising the steps of: obtaining the residual image, said residual image having a size and an energy; and decomposing said residual image into a list of one or more atoms, each atom representing a basis function from the overcomplete library, said step of decomposing said residual image including the steps of: (i) identifying a replacement region in the residual image for representation by an atom using a residual energy segmentation algorithm; (ii) creating a subset of basis functions from the overcomplete library, each basis function in the subset matching with the replacement region within a predetermined threshold; (iii) identifying an atom within the subset of basis functions, said atom for representing the replacement region and said atom having parameters; (iv) quantizing said atom and modifying the parameters of the atom into a form suited for encoding; (v) encoding said quantized atom, subtracting said atom from the replacement region in the residual image thereby reducing the energy of the residual image and using a quadtree-based atom coder to reduce the size of the residual image; and (vi) comparing the reduced size of the residual image or the reduced energy of the residual image with a predetermined criteria and repeating steps (i) to (vi) until the predetermined criteria is achieved; thereby encoding said residual image and reducing the size thereof to a predetermined level.

In accordance with another aspect of the present invention there is provided an apparatus for encoding a residual image using basis functions from an overcomplete library, said apparatus comprising: means for obtaining the residual image, said residual image having a size and an energy; and means for decomposing said residual image into a list of one or more atoms, each atom representing a basis function from the overcomplete library, said means for decomposing said residual image including: (i) means for identifying a replacement region in the residual image for representation by an atom using a residual energy segmentation algorithm; (ii) means for creating a subset of basis functions from the overcomplete library, each basis function in the subset matching with the replacement region within a predetermined threshold; (iii) means for identifying an atom within the subset of basis functions, said atom for representing the replacement region and said atom having parameters; (iv) means for quantizing said atom and modifying the parameters of the atom into a form suited for encoding; (v) means for encoding said quantized atom, subtracting said atom from the replacement region in the residual image thereby reducing the energy of the residual image and using a quadtree-based atom coder to reduce the size of the residual image; and (vi) means for comparing the reduced size of the residual image or the reduced energy of the residual image with a predetermined criteria; thereby encoding said residual image and reducing the size thereof to a predetermined level.

In accordance with another aspect of the present invention there is provided a computer program product comprising a computer readable medium having a computer program recorded thereon for performing a method for encoding a residual image using basis functions from an overcomplete library comprising the steps of: obtaining the residual image, said residual image having a size and an energy; and decomposing said residual image into a list of one or more atoms, each atom representing a basis function from the overcomplete library, said step of decomposing said residual image including the steps of: (i) identifying a replacement region in the residual image for representation by an atom using a residual energy segmentation algorithm; (ii) creating a subset of basis functions from the overcomplete library, each basis function in the subset matching with the replacement region within a predetermined threshold; (iii) identifying an atom within the subset of basis functions, said atom for representing the replacement region and said atom having parameters; (iv) quantizing said atom and modifying the parameters of the atom into a form suited for encoding; (v) encoding said quantized atom, subtracting said atom from the replacement region in the residual image thereby reducing the energy of the residual image and using a quadtree-based atom coder to reduce the size of the residual image; and (vi) comparing the reduced size of the residual image or the reduced energy of the residual image with a predetermined criteria and repeating steps (i) to (vi) until the predetermined criteria is achieved; thereby encoding said residual image and reducing the size thereof to a predetermined level.

DETAILED DESCRIPTION OF THE INVENTION

The current invention is an new coder for overcomplete-transform based residual picture coding, used for motion compensated video compression systems. This invention is analogous to previous matching pursuit video coders in that they decompose the residual image into a list of atoms, which represent basis functions from an overcomplete dictionary. The atom finding process, however, is performed using a Residual Energy Segmentation Algorithm (RESA) and a Progressive Elimination Algorithm (EA). The basis dictionary can be very large in order to characterize the features appearing frequently in motion residual images. To find an atom, RESA identifies the approximate shape and position of regions with high energy in the motion residual images such that a good match can be found by comparison with a smaller subset of bases within the dictionary. Furthermore, PEA progressively removes pattern candidates from consideration by pre-computing the energy of search windows, thereby reducing the computation time needed to find the best match. Whenever a matched atom is found, the residual image is updated by removing the part characterized by the atom. The foregoing steps of finding atoms and updating residual images are repeated until the desired compression bit rate or quality has been achieved.

The invention introduces a new modulus quantization scheme for matching pursuit with an overcomplete basis, that changes the atom finding procedure. The coefficients produced directly from the transform are continuous floating-point values, which require quantization for optimal digital coding under a bit budget. In the matching pursuit algorithm, it is necessary to use an in-loop quantizer—where each found atom is first quantized, and then used to update the residual image. As such each atom affects the selection of subsequent atoms. If the quantizer is specified before coding begins, as in previous matching pursuit methods, it is difficult to optimize the quantization scheme as the optimal quantizer design depends on statistics of the list of chosen atom moduli. The quantization scheme according to the present invention chooses the quantizer adaptively during the atom searching process.

In addition to the atom modulus, the index of the chosen basis and the position of the atoms need to be transmitted in an overcomplete-transform based coder. The invention includes a method to code the atom position information efficiently. The atom position distribution forms a 2D map, where pixel values of one and zero represent the presence of atoms or lack thereof in each position respectively. A quadtree like technique enables coding of the position map. The modulus and basis index information are embedded in the position coding. The atoms for different channels of color video (Y, U, V) are coded independently.

All atom parameters are transmitted after they have been encoded into a compressed version of the residual images. For the decoding process, the decoder reconstructs the residual image through interpreting the coded bit stream back into atom parameters and combining the atom information to form the reconstructed stream of residual images that are then combined with the motion compensated image to form the reconstructed video stream.

The present invention is a method for encoding motion residual images comprising the steps of: forming the atom decomposition of the residual image in an overcomplete basis space using the modified matching pursuit algorithm; choosing the modulus quantizer; coding the atom position map, modulus as well as the index for the selected basis. The present invention further provides a method for decoding residual signals that have been encoded using the above encoding method.

Figure 1:
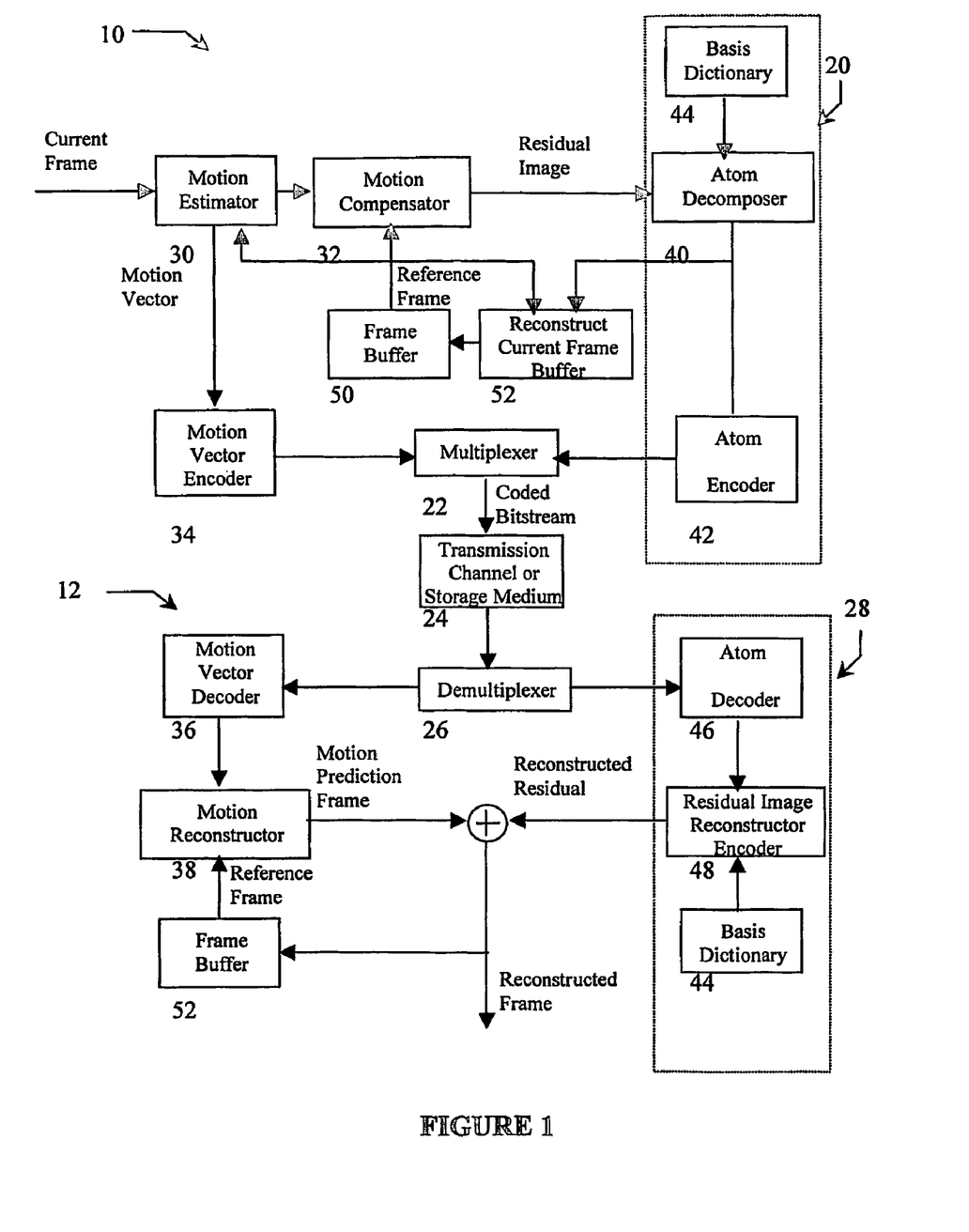
FIG. 1 illustrates the overall diagram of video compression systems that use the over-complete basis transform and associated coding methods according to one embodiment of the present invention.

FIG. 1 illustrates the associated processing executed by a video compression apparatus 10 that employs the residual image coder 20 according to one embodiment of the present invention. The video frame is initially processed by a motion estimator 30, which compares the current frame with one or two reference frames. In most cases, objects in the video change their position in successive frames while the background remains the same. Since the reference frames have been transmitted to the video decoder 12, some regions in the reference frame can be used to construct the current frame. The motion estimator 30 identifies those regions within the reference frames that are similar to regions within the current frame. The motion compensator 32 produces the difference between those similar regions and combines them as a motion residual image. The position relationships between similar regions are represented as motion vectors, which are processed by the motion vector encoder 34. The atom decomposer 40 processes the residual image first, and then the atom encoder 42 compresses the resulted atoms. The coded motion vectors and atoms are combined into one bit stream by the multiplexer 22. The compressed video is transmitted or stored by apparatus 24, which can deliver the video in compressed format to the video decoder 12.

The lower part of FIG. 1 illustrates the decoder 12, in which the demultiplexer 26 separates the compressed video signal, sending corresponding bits to the motion vector decoder 36 and the residual image decoder 28, respectively. The motion reconstructor 38 forms the prediction frame from the reference frame and the motion vector. The residual image decoder 28 reconstructs the residual image. These two signals, namely the prediction frame and the residual frame are added together to generate the final reconstructed video frame.

Figure 2:
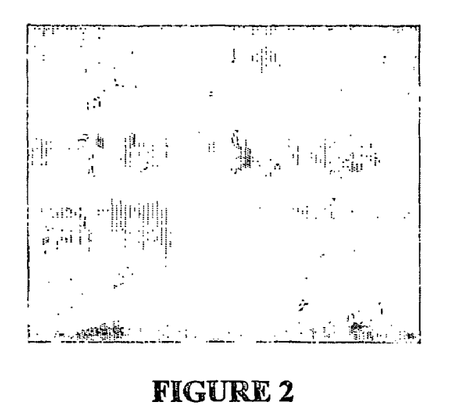
FIG. 2 is an example of a motion residual image processed by one embodiment of the present invention.

FIG. 2 is an example motion residual image for the Y colour channel. The original residual image has both negative and positive values. For proper displaying of the residual image as a 256 level gray image, the pixel values in the residual image are shifted and scaled so that pure gray means zero, while black and white represent negative and positive values, respectively. For example, the residual image comprises several high-energy regions, which correspond to the motion of objects in the video.

Figure 3:
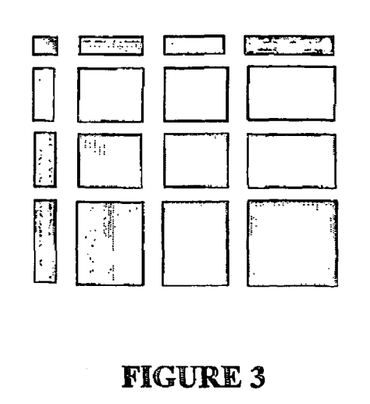
FIG. 3 illustrates a simple dictionary with 16 bases for use with one embodiment of the present invention.

Most signal compression techniques transform the original data into some more compact format through different kinds mathematical transformations. Some mathematical transforms, such as DCT and DWT, use a complete basis, which forms an invertible transformation matrix. Recently, overcomplete basis and associated transformation algorithms have received considerable attention. The number of bases in an overcomplete basis dictionary is much larger than the dimension of the original data. The benefit of an overcomplete basis is that the transformed coefficients are more effective in representing the true features in the original signal. There exist many mathematical methods to build a basis dictionary for different signals. Several dictionaries for video motion residual pictures have been designed and have been proven to cover the features in residual pictures well. For example, a basis dictionary based on separable Gabor functions has been described by Neff and Zakhor in "Very Low Bit Rate Video Coding Based on Matching Pursuits", IEEE Transactions on Circuits and Systems for Video Technology, February 1997, 158-171, and a basis dictionary based on Haar functions has been described by Vleeschouwer and Macq in "New dictionaries for matching pursuit video coding", Proc. of the 1998 International Conference on Image Processing, vol. 1, 764-768. FIG. 3 is a simple example dictionary containing 16 bases. Any of the above dictionaries can be used with the present invention. Having particular regard to the above-mentioned Gabor dictionary, there are 400 2D functions explicitly mentioned. However, it actually includes many more basis structures implicitly since each of those 400 2D functions can be placed at every possible position within the image. Using a frame size of 176×144 pixels implies that the dictionary actually contains 400×176×144=5.7 million bases structures—which makes it highly overcomplete. The transformation directly using the "matching pursuit algorithm" described by S. Mallat and Z. Zhang in "Matching Pursuits With Time-Frequency Dictionaries", IEEE Transaction in Signal Processing, vol. 41, No. 12, December 1993, will take an extremely large number of computations to determine the transform coefficients. The matching pursuit for video compression, invented by Zakhor and Neff in U.S. Pat. No. 5,699,121, reduces the calculation burden, however it remains computationally expensive. The present invention provides a way to transform residual images based on general dictionaries, which is performed by the atom decomposer 40, and a way to code the transformed coefficients, which is the task of the atom encoder 42.

Figure 4:
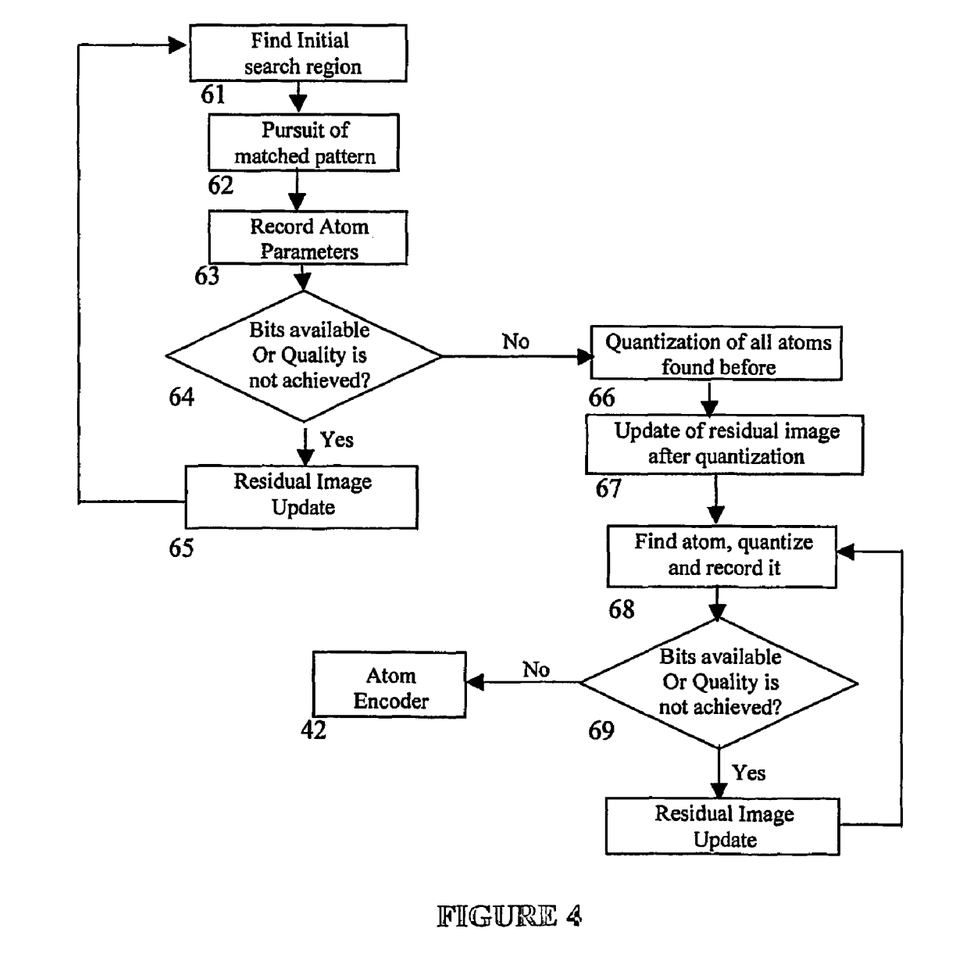
FIG. 4 describes the whole atom decomposition process based on over-complete basis according to one embodiment of the present invention.
Figure 5:
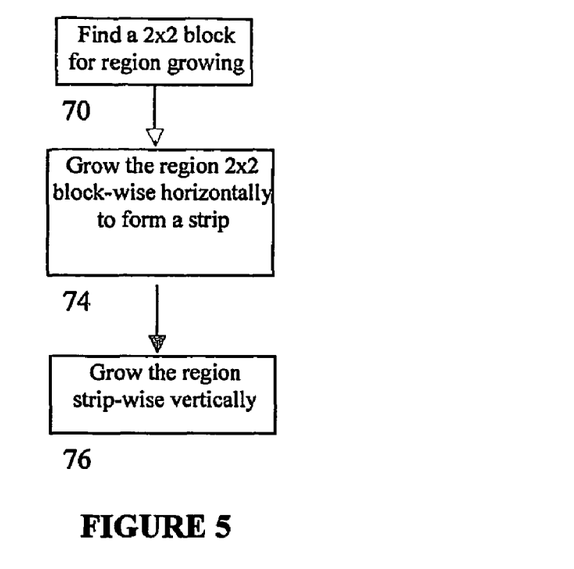
FIG. 5 describes the basic steps executed by the residual energy segmentation algorithm (RESA) according to one embodiment of the present invention.
Figure 6:
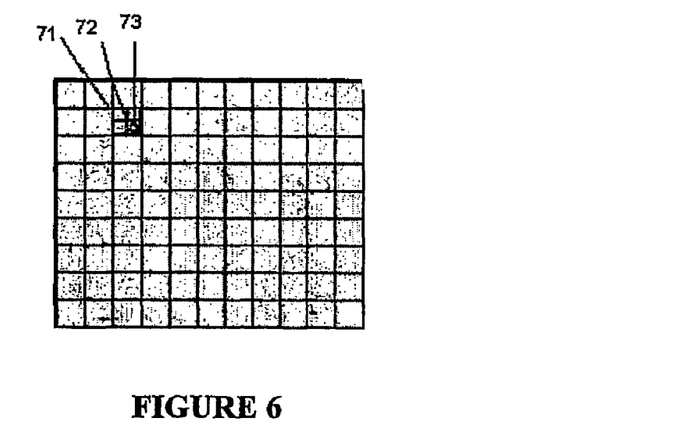
FIG. 6 illustrates the first step of RESA according to one embodiment of the present invention.

The operation of the atom decomposer 40 is fully described in FIG. 4, according to one embodiment. The first step (block 61) executed by the atom decomposer 40 is to find the initial search region. This step is realized by the residual energy segmentation algorithm (RESA), wherein one embodiment thereof is shown in FIG. 5. RESA is based on a general region growing idea. It initially selects a 2×2 block as a starting point for region growing (block 70). This step requires the division of the residual image into 16×16 blocks, as shown in FIG. 6. The energy, which is the sum of the square of all pixel intensities, is computed for each block, and the block with the highest energy is identified as block 71 shown in FIG. 6, for example. Block 71 is further divided into four 8×8 sub-blocks, and the sub-block 72 with the highest energy is identified. Within that 8×8 sub-block 72, the highest energy 2×2 block 73 is also identified, wherein this block will be used as the starting point for region growing.

Figure 7:
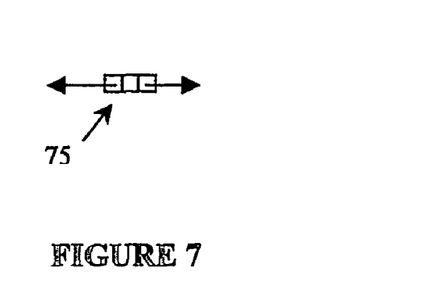
FIG. 7 illustrates the second step of RESA: the horizontal growing scheme, according to one embodiment of the present invention.

The next step of RESA (block 74 illustrated in FIG. 5) is to check the 2×2 block in the left side of the current region. FIG. 7 illustrates this step of RESA. A threshold is calculated dynamically as:

$$T=AE^*\max(7-AU, 5)/10$$

where AU is the number of blocks that have been added on the left side of the start block, and AE is the average energy per 2×2 block of the current region. If the energy of the checked 2×2 block is larger than the current threshold, the tested 2×2 block is grouped with the current region, together forming a new larger current region. Otherwise, a stop point has been found on this side, and we do not group the blocks together. In a similar, symmetric fashion, check the 2×2 block on the right side of the current region. Continue growing first the left side and then the right side, until stop points are found on both sides or the width of the rectangle has reached 32, (whichever comes first). A horizontal strip rectangle 75 is formed after this step, wherein the dimension of the strip is 2*2 m, 1<=m<=16.

Figure 8:
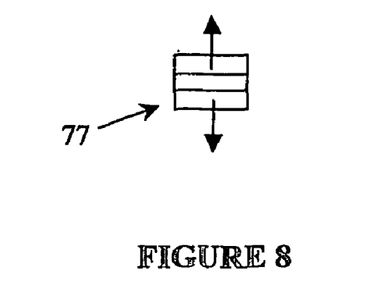
FIG. 8 illustrates the third step of RESA: the vertical growing scheme, according to one embodiment of the present invention.

The final step of RESA (block 76 in FIG. 5) is to grow the region vertically based on strip 75, as shown in FIG. 8. Assume the width of the strip 75 is W. Consider the 2*W strip rectangle above the current region, together with a threshold:

$$Ts=AEs^*\max(7-AUs, 5)/10$$

where AUs is the number of 2*W rectangles that have been added above the initial strip and AEs is the average energy per 2*W rectangle included in the current region. If the tested 2*W rectangle has an energy that is larger than a threshold, merge it into the current region. Otherwise, a stop point has been found on this side. In a similar, symmetric fashion, check the 2*W rectangle below the current region. Continue growing first above and then below, until stop points are found on both sides or the height or the current region has reached 32, (whichever comes first). In the end we obtain a rectangle 77 that has dimension 2 n*2 m, 1<=n,m<=16.

Figure 9:
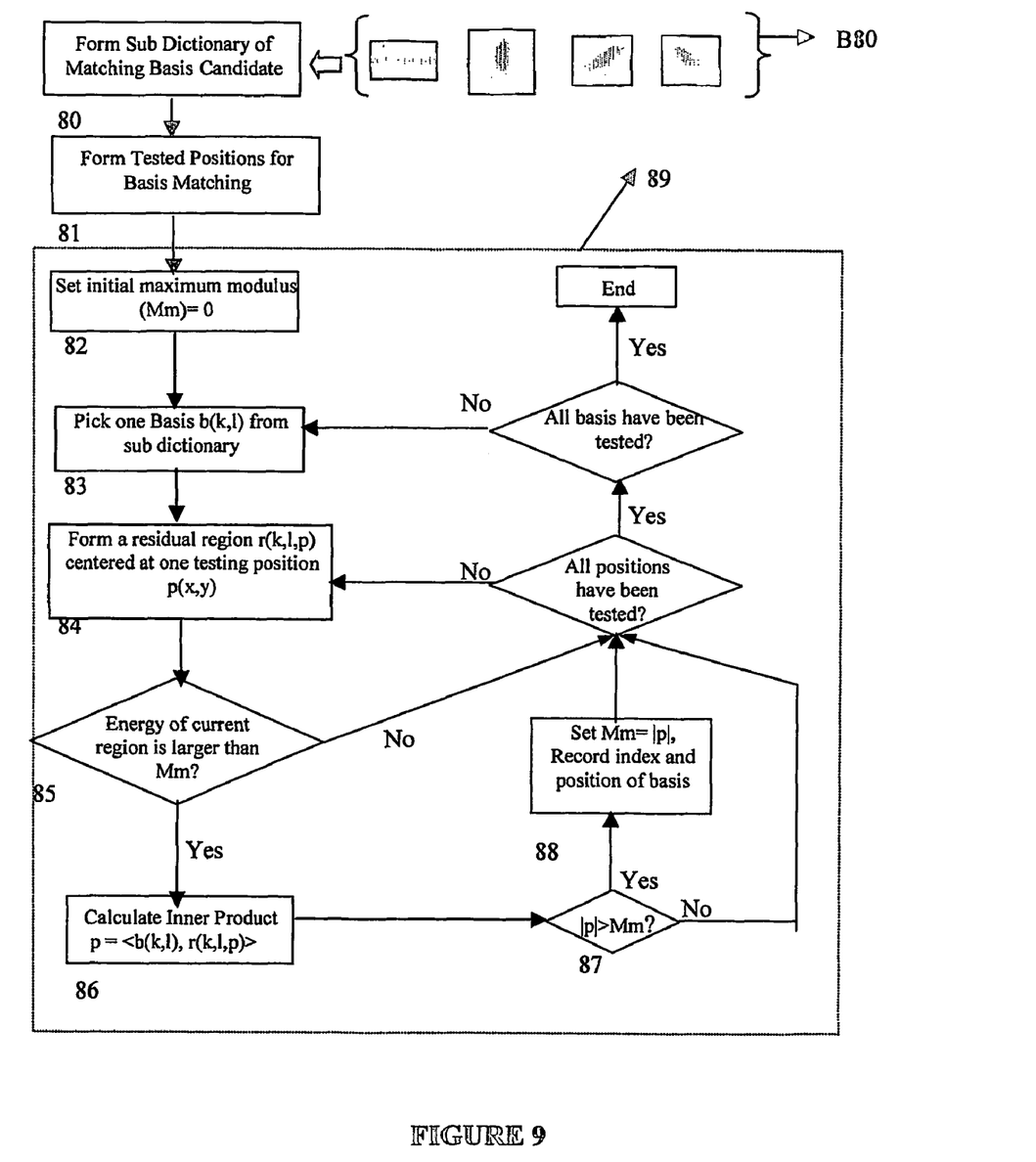
FIG. 9 describes the matching pursuit atom search using the progressive elimination algorithm (PEA) according to one embodiment of the present invention.

With further reference to FIG. 4, the process for finding the closest matched basis from the given dictionary is illustrated (block 62). The degree of matching between a basis and the residual image is represented by the absolute value (modulus) of their inner product, which is called the atom modulus, wherein a large modulus implies a good match. The process of determining this modulus requires computing a number of inner products, and selecting the one with the largest modulus as the current atom. This process can be the slowest part of the matching pursuit algorithm. In the classical matching pursuit algorithm, the inner product between the residual image and each of the millions of elements in the dictionary would need to be computed to determine the modulus. In the prior art for example, the 16*16 block with the highest energy in the residual image is simply selected as the initial search region—each basis structure is centered at each location in the chosen block, and the inner product between the basis structure and the corresponding residual region will be computed. For a dictionary with 400 basis, this process requires 256×400=102400 inner product calculations. FIG. 9 illustrates the new matching pursuit process according to the present invention.

Figure 10:
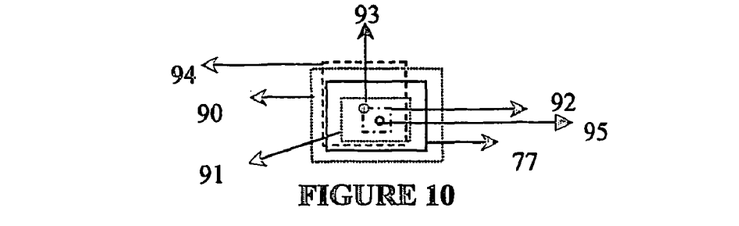
FIG. 10 illustrates how to form the sub dictionary of matching basis and searching position candidates according to one embodiment of the present invention.

The resulting RESA rectangle 77 in FIG. 8 provides an initial estimation for the shape of the high-energy feature. It is used to filter out bases in the dictionary that have a shape that is too different from the RESA rectangle. A subset of matching basis candidates (block 80) is then formed. Assume the width and height of rectangle 77 is w and h respectively, a sub-dictionary is formed containing all bases with shapes, specified by width and height respectively, that satisfies:

$$w-tw1 <= \text{width} <= w+tw2 \text{ and } h-th1 <= \text{height} <= h+th2$$

where tw1,tw2,th1 and th2 are values set to confine the basis size. These values may be changed and adjusted according to the dictionary structure. The largest and smallest sizes of tested bases are illustrated as rectangle 90 and 91 illustrated in FIG. 10. For example, block B80 is a simple sub-dictionary example containing four bases.

RESA can further estimate the location of high-energy features in the residual image. The position candidates for matching bases are selected around the center of the RESA rectangle 77 (block 81). FIG. 10 shows a small rectangle 92 whose center is the same as RESA rectangle 77. It is supposed that all pixels within rectangle 92 will work as a center for the tested residual region. Rectangle 94 in FIG. 10 is an example whose center is point 93, or the left-top corner of rectangle 92. The width (ws) and height (hs) of rectangle 92 is supposed to be variable with RESA rectangle 77. The relationship is:

$$ws=2*\min(w/2+1,6) \text{ and } hs=2*\min(h/2+1,6)$$

The size of rectangle 92 can be decided by other rules or simply be fixed in an implementation. The basic idea is that a good match is located around the center of the RESA rectangle 77. Furthermore, any positions within rectangle 92 that already contain the center of an atom will not be considered for any new atoms. Point 95 in FIG. 10 is an example. It should be noted that the prior art does not place such a restriction. The idea for this type of restriction is that if one atom provides a good fit, it should remove the energy around its center without introducing too much extra energy at its boundary. As such it is not desired for the matching pursuit algorithm to return to the same position to produce a second atom. This restriction of forcing no position repetition has almost no effect on coding performance and can make the coding of the atom position information simpler.

The next processing step (block 89 in FIG. 9) is called the progressive elimination algorithm (PEA) for the residual matching pursuit. It is independent of the method used to form the testing basis sub-dictionary and set of testing positions. For example, PEA will still operate if the sub-dictionary is the entire dictionary, and the set of position candidates is the set of coordinates comprising the whole residual image. PEA is a method of finding the closest matching basis more efficiently by progressively removing comparison candidates from consideration. This contrasts with classical matching pursuit, which compares all basis candidates at all possible positions. Initially the maximum modulus Mm is set to be zero (block 82). Next a basis b(k,l) is considered (block 83), where k and l represents the width and height of the 2D basis function. A same sized region centered at one position candidate r(k,l,p) in the residual image is formed (block 84). Block 85 compares $\|r(k,l,p)\|$, the energy of r(k,l,p), with the current maximum modulus (Mm) to decide if there is a need to calculate the inner product between r(k,l,p) and b(k,l). In order to explain this operation, recall the mathematical triangle inequality:

$$|<r(k,l,p),b(k,l)>| <= \|r(k,l,p)\| \, \|b(k,l)\|$$

The objective of matching pursuit is to find the maximum $|<r(k,l,p),b(k,l)>|$. Assume the current maximum modulus is Mm. If, for basis b(k,l) at position p, the corresponding residual r(k,l,p) satisfies $\|r(k,l,p)\| \, \|b(k,l)\| <= Mm$, then:

$$|<r(k,l,p),b(k,l)>| <= \|r(k,l,p)\| \, \|b(k,l)\| <= Mm$$

In this case, it is unnecessary to calculate the inner product $<r(k,l,p),b(k,l)>$, and the region r(k,l,p) is moved to the next position. The norm of basis $\|b(k,l)\|$ can be calculated a priori (actually most of the basis are normalized, namely $\|b(k,l)\|=1$), the only overhead for this test then is to calculate the energy of r(k,l,p). An effective algorithm to determine $\|r(k,l,p)\|$, is described below.

Figure 11:
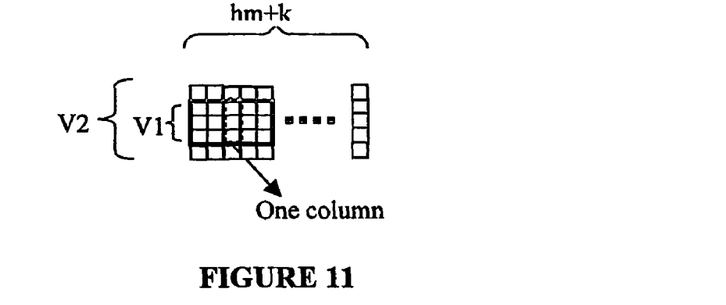
FIG. 11 illustrates the fast calculation of region energy according to one embodiment of the present invention.

Assume there are n different sizes of basis heights $\{v_1, v_2, \ldots, v_n\}$, and m different sizes of basis widths $\{h_1, h_2, \ldots, h_m\}$, that are increasingly ordered. The search rectangle dimension is hs*ws, and the left-top point of the search rectangle is p(x,y). The hs*ws*n*m energy values can be calculated through the following four steps:

Step 1: Calculate the energy for the $s=h_m+k$ columns (FIG. 11 shows an example of the columns). These columns are centered at $(x-h_m/2+i,y)$, i=0, 1, ..., s-1. Their height is $v_1$. Their energy is represented as $C_{1,0}(0), C_{1,1}(0), \ldots C_{1,s}(0)$, and calculated as:

$$C_{1,i}(0)=e(x-h_m/2+i,y-v_1/2)+ \ldots +e(x-h_m/2+i,y)+ \ldots +e(x-h_m/2+i,y+v_1/2)$$

where e(x,y) represents the energy of pixels at position (x,y).

The energies for the next s columns with same coordinates as above strips and length $v_2$ can be computed as:

$$C_{2,i}(0)=C_{1,i}(0)+\text{Extra}(v_2-v_1)\text{Pixels Energy}, i=1, 2, \ldots s$$

Generally, we have:

$$C_{j,i}(0)=C_{j-1,i}(0)+\text{Extra}(v_j-v_{(j-1)})\text{Pixels Energy}, i=1, 2, \ldots s; j=1, 2, \ldots n$$

Step 2: Calculate energy of columns that are vertical shift of columns in Step 1, using:

$$C_{j,i}(a)=C_{j,i}(a-1)-e(x-h_m/2+i,y-v_1/2+a-1)+e(x-h_m/2+i,y+v_1/2+a), a=1, \ldots, hs$$

where a represents the vertical shift number corresponding to y.

Step 3: Calculate the energies of regions with height vj, j=1, ..., n) and width $h_1, h_2, ..., h_m$ and center (x,y+a), (v=0, 1, ..., hs) using:

$$S_{j,1}(0,a) = C_{j,(hm-h1)/2}(a) + ... + C_{j,hm/2}(a) + ... + C_{j,(hm+h1)/2}(a)$$

$$S_{j,2}(0,a) = S_{j,1}(0,a) + \text{Extra}(h_2-h_1)\text{columns' energy}$$

Generally, $$S_{j,i}(0,a) = S_{j,i-1}(0,a) + \text{Extra}(h_i - h_{(i-1)})\text{columns' energy}, \quad i=1, ..., m$$

Step 4: Calculate the energies of the first set of regions with vertical base length $v_j$, (j=1, ..., n) and horizontal base length $h_i$, (i=1, ..., m) and center (x+b,y+a), (b=1, ..., ws and a−1, ..., hs) using:

$$S_{j,i}(b,a) = S_{j,i}(b-1,a) - C_{j,(hm-hi)/2+b-1}(a) + C_{j,(hm+hi)/2+b}(a)$$

The maximum modulus can be updated successively during the matching pursuit process; this can progressively confine the search space. Several bases can have the same sizes, thus one energy calculation may avoid several inner product calculations. The performance of PEA is also related with how fast a good match (not necessarily the best match) is found. Because large regions always contain more energy, bases of larger dimension are tested first.

Figure 12:
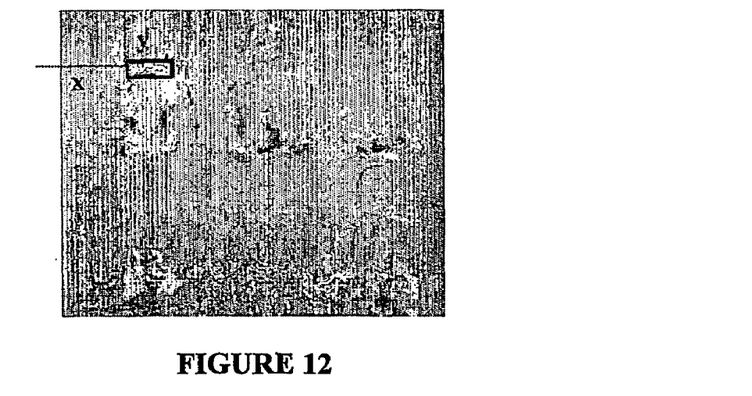
FIG. 12 illustrates the parameters for one atom according to one embodiment of the present invention.

If $\|r(k,l,p)\| > Mn$, block 86 is executed to calculate the inner product (p) between r(k,l,p) and b(k,l). Block 87 compares the absolute value of p with current maximum modulus Mm. If |p|>Mm, the new Mm is set as |p| and the corresponding basis index and position are recorded. Regardless, we keep returning to block 84 until all search positions have been checked. Then blocks 83 through 88 are run repeatedly until all basis candidates have been tested. Finally, an atom is produced which includes three parameters: 1. The index of basis in the dictionary that gives the best match; 2. The location of the best match in the residual image with (x, y) coordinates; and 3. The inner product (p) between the basis and the residual image. FIG. 12 shows an example of an atom on a residual image.

With further reference to FIG. 4, the step after finding an atom is to record the atom parameters (block 63). Note in this stage, no quantization of the atom's modulus is performed. Decision block 64 will decide when to begin atom quantization. Its operation depends on the rate control goal defined by the video compression system. If the compression ratio is fixed, block 64 will check if bits are still available for more atoms. Because no actual coding has been done yet, the used bits for coding the current atoms has to be estimated. Let "Bip" represent the average bits for coding the basis indices and positions, "Bm(i)" represents the actual bits for the i'th atom's modulus without quantization. Allocating one bit for the sign of inner product (p), then the used bits for n atoms are estimated as:

$$\text{Used Bits} = n^*(Bip+1) + \Sigma(Bm(1) + Bm(2) + ... Bm(n))$$

where "Bip" is initialized according to experiential data for a first residual frame; and set as real value of last frame. Bm(i) can be known exactly for each modulus. An important fact is that the modulus will be quantized later and will result in fewer bits to be used than currently estimated. Thus in this stage, there will typically be fewer atoms than what can coded. If the video system wants to achieve a certain quality, which is defined by the mean square error (MSE) of the coded residual image as compared to the actual residual image, block 64 will compare the current MSE achieved with the MSE objective. The MSE after introducing one atom is updated according to following equation:

$$MSE(n) = MSE(n-1) - p(n)^* p(n)$$

where MSE(n) represents the MSE after using n atoms and p(n) represents the inner product of nth atom. Initially the MSE, or MSE(0), is set to the energy of original residual image. After quantization is performed, MSE(n) will likely increase, and therefore will no longer achieve the MSE objective. In summary, if bits are available or the quality goal has not been achieved, the residual image will be updated based on the current atom (block 65), followed by a search for another atom recommencing at block 61. Otherwise if the bit or quality objective has been achieved; block 66 is executed for the quantization design. Residual image updating, one step for the standard matching pursuit algorithm, can be described mathematically as:

$$r(k,l,p) = r(k,l,p) - p(n)^* b(k,l)$$

All regions not covered by the current atom will be unchanged.

The design of the quantizer (block 66) is based on the minimum modulus (Minm) value found so far. The quantization step size (QS) is set to:

$$QS = \begin{cases} 32 & \text{if Min}m > 24; \\ 16 & \text{if } 2 < \text{Min}m <= 24; \\ 8 & \text{if } 6 < \text{Min}m <= 12 \\ 4 & \text{if Min}m <= 6; \end{cases}$$

All atoms found up to this point, will be quantized using the above QS in the simple mid-read scalar quantization scheme. Next the residual image is updated again according to the now quantized list of atom moduli 67. Assume that the atom coefficient before and after quantization are p(i), q(i) respectively (i=1, ..., n). Assume that the corresponding bases are b(i), (i=1, ..., n). The residual image after n unquantized atoms is:

$$E(n) = (\text{Original Residual}) - p(1)b(1) - p(2)b(2) - ... - p(n)b(n)$$

Its energy $\|E(n)\|$ is known also. There are two ways to calculate the residual energy after quantization. The first way is to simply calculate the residual image after quantization as:

$$EQ(n) = (\text{Original Residual}) - q(1)b(1) - q(2)b(2) - ... - q(n)b(n)$$

Another way is to update it recursively. Assume the quantization error for p(i) is $\Delta p(i)$. Then the residual image with only p(n) being quantized is:

$$EQ(1) = E(n) - \Delta p(n)b(n) \text{ and } \|EQ(1)\| = \|E(n)\| + \Delta p(n)^* \Delta p(n) - 2\Delta p(n) < E(n), b(n)>$$

The residual with the quantization of p(n) and p(n−1) becomes:

$$EQ(2) = EQ(1) - \Delta p(n-1)g(n-1)$$

This relationship is true recursively and can be written as:

$$EQ(i) = EQ(i-1) - \Delta p(n-i+1)g(n-i+1), i=1, 2, ..., n,$$
$$EQ(0) = E(n)$$

The corresponding energy is:

$$\|EQ(i)\| = \|EQ(i-1)\| + \Delta p(n-i+1)\Delta p(n-i+1) - 2^* \Delta p(n-i+1) < EQ(i-1), g(n-i+1)>$$

Finally, we will get EQ(n) and $\|EQ(n)\|$, which is the start point for further atom finding. An important thing is that the list of atoms can be in any order for the recursive update to occur—the update does not need to occur in the order in which the atoms were found.

Because the moduli of atoms have been quantized, more atoms will now be necessary to achieve the rate control or quality objective. Therefore, block 68 is executed to find additional atoms. The process is the same as block 61 through 63. However, the atom moduli will be quantized immediately in this stage. We now need to deal with atoms whose moduli is smaller than (QS−QS/4), without throwing them out by setting their quantization value to zero. The scheme used is given below:

1. If the atom modulus is larger than (QS−QS/4) then quantizer is using QS;
2. Otherwise, if the atom modulus is larger than (QS/2−QS/8) then it is quantized as value QS/2;
3. Otherwise, if the atom modulus is larger than (QS/4−QS/16) then it is quantized as value QS/4;
4. Otherwise, if the atom modulus is larger than (QS/8−QS/32) then it is quantized as value QS/8.

In practice, three levels down is typically sufficient, although more levels may be used.

After block 68, a real rate control logic unit is executed (block 69). Because the atoms are quantized in-loop in this stage, the achieved quality or actual number of bits used can be estimated. When the compression goal is achieved, the system will go into the atom encoder 42. Otherwise, the residual image will be updated based on the quantized atom modulus and the system will return to block 68 to find the next atom. For colour video, a residual image contains several channels, i.e. Y, U and V channels. The atom decomposer 40 will be used for each channel independently. With this scheme, each channel can have its own bit budget or desired quality goal. There are certain bit allocation methods, which can be used to allocate bit budgets for the different channels.

Figure 13:
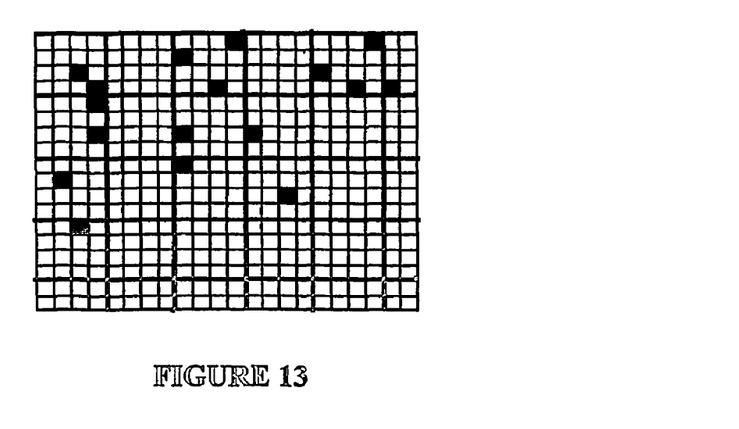
FIG. 13 is an example of an atom position map according to one embodiment of the present invention.
Figure 14:
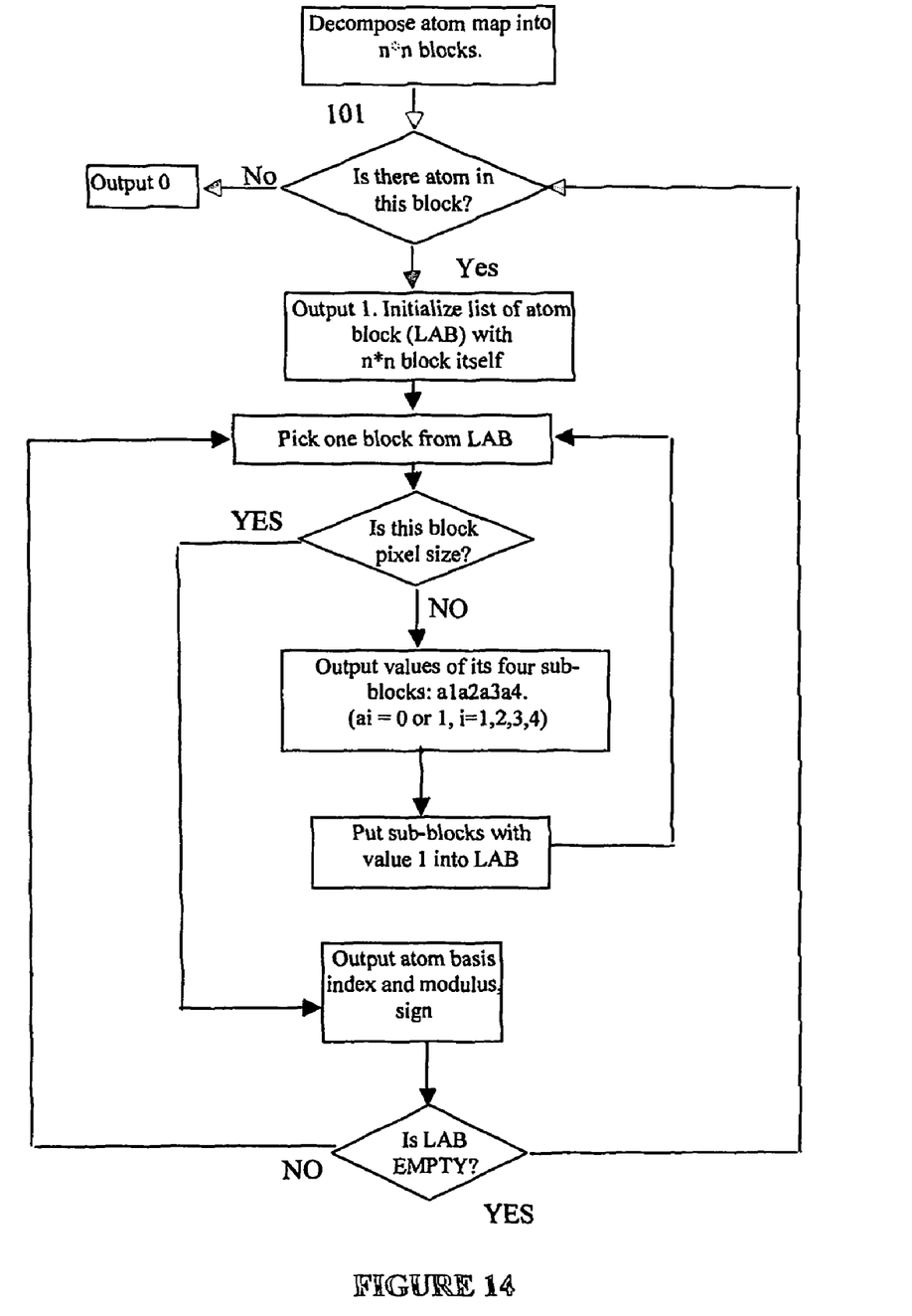
FIG. 14 is a flowchart illustrating the atom encoding process according to one embodiment of the present invention.

All the atoms are passed to the atom encoder 42 for output in a compressed form. The present invention considers the atom distribution for each channel as a bi-value map, as illustrated in FIG. 13. The black pixels represent atoms in their corresponding position, while the white pixels represent a lack of atoms in that position. A quadtree-like technique can be used to encode the positions containing atoms, although other techniques may be used as would be readily understood. The other parameters of each atom can be encoded after the atoms position information, using variable length coding, for example, however other encoding techniques may be used as would be know to a worker skilled in the art. The coding procedure for the atom parameter signal is illustrated in FIG. 14 and described in more detail below.

The first step of atom encoding is to decompose the whole atom map, for example as illustrated in FIG. 13, into n*n blocks (Block 101). The value n may either be 16 (for the Y channel) or 8 (for the U and V channels). For each n*n block, if there are no atoms in the block, a zero-bit is output; otherwise, a one-bit is output, and the block is processed further to locate the atoms to the decoder. A quadtree decomposition procedure is used for this, and is summarized in the following four steps:

Step 1. Initialize a list of atom blocks (LAB) with one element—the n*n block itself.
Step 2. Pick one element e from LAB. If e's size is 1*1, output all atom parameters except for the position: namely the basis index, modulus and the sign of the inner product of e should be output, then proceed to step 4; otherwise, proceed to step 3.
Step 3. Output the atom pattern bits of the four sub-blocks of e: $a_1a_2a_3a_4$, where $a_i$ (i=1,2,3,4) is one if there is an atom in the corresponding sub-block and zero otherwise. Put all sub-blocks i with as value equal to 1 into the end of the LAB and return to step 2.
Step 4. Check if the LAB is empty. If it is not empty, return to step 2; otherwise the encoding finishes for the one n*n block.

The basis index and atom modulus can be coded using a variable length coder to conserve bits, since these signal parameters may not be uniformly distributed. The atom position information can be encoded implicitly by recording the decomposition procedure with the 0/1 bit data. A variable length coding method can be used to encode the atom pattern bits of the four sub-blocks: $a_1a_2a_3a_4$. There are 15 kinds of patterns for the atom pattern bits, $a_1a_2a_3a_4$, wherein it should be noted that 0000 is impossible. However, some patterns, such as 1000, occur with a much higher probability than other patterns. The probability of the different patterns can be estimated through experiments and used to create a variable length table design. Further, it should be noted that the probability distribution can be variable for different channels and different atom densities. Therefore multiple tables can be used, and the block's category information can be encoded first so the decoder knows which table should be used for decoding purposes.

Figure 15:
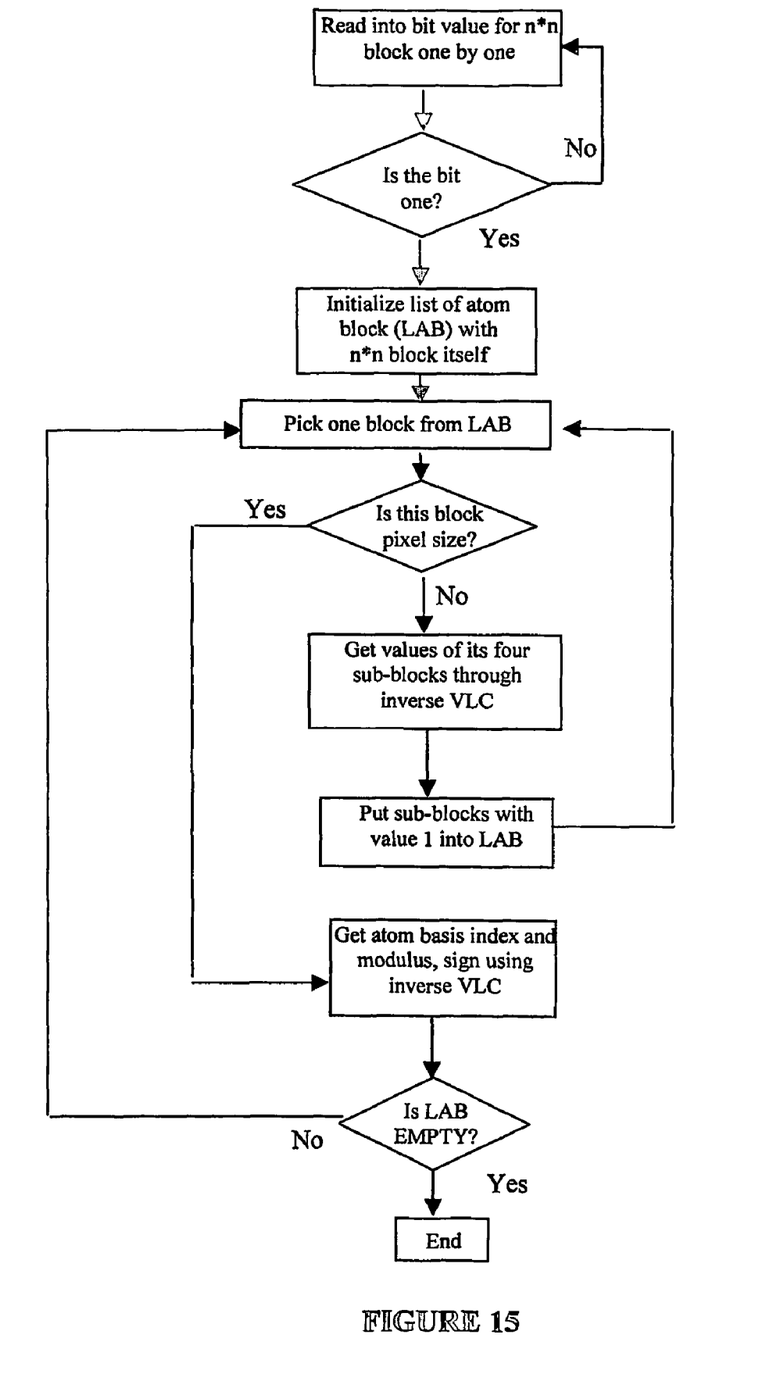
FIG. 15 is a flowchart illustrating the decoding of a compressed residual signal according to one embodiment of the present invention.

FIG. 15 illustrates the atom decoder 46, which performs operations that are the inverse of those performed by the atom encoder 42. First, the atom decoder 46 receives one bit representing the status for the current n*n block. If the value is one, it is processed through the symmetric quadtree decomposition procedure. Initially, the n*n block is divided into four sub-blocks. The atom pattern bits for the four sub-blocks are decoded using inverse variable length coding (VLC). Then all the sub-blocks with value 1 are put into a list of atom blocks (LAB). The LAB is updated dynamically by decomposing each element in the LAB recursively and getting its atom pattern bits. If an element from the LAB is a 1*1 block, the atom basis index and the modulus should be decoded using the inverse VLC tables; the bit representing the sign of the inner product should then be read in. The atom decoder for one n*n block is finished if the LAB becomes empty.

The decoded atom parameter signal is then passed to the residual re-constructor 48, which forms the residual image one channel by one channel using the method of classical matching pursuit. Initially all pixels on the residual image are set to zero. Then each atom is added one by one using the following procedure: Let q(i) and b(i,k,l) represent the i'th atom coefficient and the corresponding 2D basis matrix respectively. If (x(i), y(i)) represents the location of the i'th atom, then the matrix q(i)*b(i,k,l) is added to the residual image constructed so far at position (x(i), y(i)) to get the new current residual image. The process repeats until all atoms have been added for the channel. Once each channel has been decomposed, the process is finished and the residual image has been reconstructed.

Those familiar with the previous matching pursuit based video coding art will recognize a number of advantages associated with the techniques according to the present invention. The atom decomposition process based on an over-complete basis space has been sped up through a more accurate energy region estimation procedure and through the progressive candidate elimination algorithm. The atom modulus quantizer design is seamlessly chosen by the atom decomposition scheme, while the previous art specified the quantizer before the transformation began. Finally, the atom encoding process is more efficient because spatial relationships between the atoms are exploited by the invented quadtree-based decomposition scheme. In particular, the prior art collects all atoms into a 1D list thereby making it harder to efficiently code them, when compared to the present invention.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for encoding a residual image using basis functions from an overcomplete library, said method comprising:

obtaining the residual image, said residual image having a size and an energy; and decomposing said residual image into a list of one or more atoms, each atom representing a basis function from the overcomplete library, decomposing said residual image comprising:

identifying a replacement region in the residual image for representation by an atom, the replacement region being determined by adding an adjacent block to an initial block of the residual image when an energy of the adjacent block exceeds an energy threshold;

creating a subset of basis functions from the overcomplete library, each basis function in the subset matching with a shape of the replacement region within a predetermined threshold;

identifying an atom within the subset of basis functions using progressive elimination, said atom for representing the replacement region and said atom having parameters;

quantizing said atom and modifying the parameters of the atom into a form suited for encoding;

encoding said quantized atom, subtracting said atom from the replacement region in the residual image to reduce the energy of the residual image and using a quadtree-based atom coder to reduce the size of the residual image; and when a reduced size of the residual image or a reduced energy of the residual image does not achieve a predetermined criteria; further identifying a replacement region, creating, identifying an atom within the subset of basis functions, quantizing, and encoding.

2. The method according to claim 1, wherein identifying a replacement region comprises:

sequentially adding further adjacent blocks to the adjacent block of the residual image in a first direction until an energy of one of the further adjacent blocks is below the energy threshold; and sequentially adding adjacent blocks to the initial block of the residual image in a second direction until an energy of one of the adjacent blocks is below the energy threshold.

3. The method according to claim 1, wherein identifying an atom within the subset of basis functions comprises determining an inner product between a basis function and the replacement region, wherein a maximum absolute value of the inner product indicates a best match.

4. The method according to claim 1, wherein identifying an atom within the subset of basis functions comprises removing basis functions from the subset of basis functions by comparing a basis function currently being evaluated with a previously evaluated basis function.

5. The method according to claim 1, wherein quantizing the atom comprises determining a quantizer based on a comparison between the atom and the replacement region.

6. The method according to claim 1, wherein the predetermined criteria is determined based on a desired bit stream size.

7. The method according to claim 4, wherein the basis function currently being evaluated is removed when the basis function currently being evaluated is determined not to be a best match using a triangle inequality.

8. An apparatus for encoding a residual image using basis functions from an overcomplete library, said apparatus comprising:

means for obtaining the residual image, said residual image having a size and an energy; and means for decomposing said residual image into a list of one or more atoms, each atom representing a basis function from the overcomplete library, said means for decomposing said residual image including:

means for identifying a replacement region in the residual image for representation by an atom, the replacement region being determined by adding an adjacent block to an initial block of the residual image when an energy of the adjacent block exceeds an energy threshold;

means for creating a subset of basis functions from the overcomplete library, each basis function in the subset matching with a shape of the replacement region within a predetermined threshold;

means for identifying an atom within the subset of basis functions using progressive elimination, said atom for representing the replacement region and said atom having parameters;

means for quantizing said atom and modifying the parameters of the atom into a form suited for encoding;

means for encoding said quantized atom, subtracting said atom from the replacement region in the residual image thereby reducing the energy of the residual image and using a quadtree-based atom coder to reduce the size of the residual image; and means for determining when a reduced size of the residual image or a reduced energy of the residual image does not achieve a predetermined criteria.

9. A computer program product comprising a non-transitory computer readable medium having a computer program recorded thereon for performing a method for encoding a residual image using basis functions from an overcomplete library comprising:

obtaining the residual image, said residual image having a size and an energy; and decomposing said residual image into a list of one or more atoms, each atom representing a basis function from the overcomplete library, decomposing said residual image including the steps of:

identifying a replacement region in the residual image for representation by an atom, the replacement region being determined by adding an adjacent block to an initial block of the residual image when an energy of the adjacent block exceeds an energy threshold;

creating a subset of basis functions from the overcomplete library, each basis function in the subset matching with a shape of the replacement region within a predetermined threshold;

identifying an atom within the subset of basis functions using progressive elimination, said atom for representing the replacement region and said atom having parameters;

quantizing said atom and modifying the parameters of the atom into a form suited for encoding;

encoding said quantized atom, subtracting said atom from the replacement region in the residual image thereby reducing the energy of the residual image and using a quadtree-based atom coder to reduce the size of the residual image; and when a reduced size of the residual image or a reduced energy of the residual image does not achieve a predetermined criteria, further identifying a replacement region, creating, identifying an atom within the subset of basis functions, quantizing, and encoding.

* * * * *